United States Patent [19]

Evans et al.

[11] Patent Number: 4,681,913

[45] Date of Patent: Jul. 21, 1987

[54] METHOD FOR PREVENTING PREMATURE CURING OF SILICONE COMPOSITIONS AND COMPOSITIONS MADE THEREBY

[75] Inventors: Edwin R. Evans, Clifton Park; Arnold Torkelson, Burnt Hills, both of N.Y.

[73] Assignee: General Electric Company, Waterford, N.Y.

[21] Appl. No.: 898,784

[22] Filed: Aug. 18, 1986

Related U.S. Application Data

[63] Continuation of Ser. No. 741,374, Jun. 5, 1985, abandoned.

[51] Int. Cl.$^4$ .............................................. C08L 83/04
[52] U.S. Cl. .................................... 524/862; 524/432; 524/433; 528/15; 528/31; 528/32; 528/901; 525/478
[58] Field of Search .................... 528/15, 31, 32, 901; 524/862, 432, 433; 525/478

[56] References Cited

U.S. PATENT DOCUMENTS

| | | | |
|---|---|---|---|
| 4,151,156 | 4/1979 | Itoh et al. | 528/30 |
| 4,245,079 | 1/1981 | Matsumoto et al. | 427/447 |
| 4,293,677 | 10/1981 | Imai | 528/15 |
| 4,431,771 | 2/1984 | Falender et al. | 528/21 |
| 4,448,927 | 5/1984 | Falender et al. | 528/32 |
| 4,461,854 | 7/1984 | Smith | 524/268 |
| 4,482,670 | 11/1984 | Saam et al. | 528/24 |
| 4,604,424 | 8/1986 | Cole et al. | 528/15 |

*Primary Examiner*—Melvyn I. Marquis
*Attorney, Agent, or Firm*—Gary L. Loser; John W. Harbour

[57] ABSTRACT

There is provided a method for preventing premature curing of curable silicone compositions comprising admixing with said curable composition an amount of Lewis base effective to neutralize any Lewis acid present therein.

18 Claims, No Drawings

METHOD FOR PREVENTING PREMATURE CURING OF SILICONE COMPOSITIONS AND COMPOSITIONS MADE THEREBY

This application is a continuation, of application Ser. No. 741,374, filed 06/05/85, now abandoned.

BACKGROUND OF THE INVENTION

The present invention relates to a method for preventing premature curing of silicone compositions and to compositions made thereby. More particularly, the present invention substantially eliminates premature curing of silicon hydride containing silicone compositions caused by the presence of residual Lewis acids by adding thereto an effective amount of Lewis base.

Curable silicone compositions comprising (a) a vinyl-containing base polymer, (b) an organohydrogenpolysiloxane crosslinking agent and (c) a precious metal or precious metal containing hydrosilylation catalyst as well known in the art, for example, as described in U.S. Pat. No. 3,284,406 to Nelson and U.S. Pat. No. 3,436,366 to Modic, both of which are incorporated by reference into the present disclosure.

More recently a great deal of interest has been shown in fluorosilicone compositions. Such fluorosilicone compositions are based on the same addition cure chemistry as U.S. Pat. Nos. 3,284,406 and 3,436,366, however, by including perfluoroalkylsiloxy units in the vinyl-containing base polymer excellent solvent resistance was obtained. Examples of fluorosilicone compositions can be found in U.S. Pat. No. 4,029,629 to Jeram, U.S. Pat. No.4,041,010 to Jeram, U.S. pat. application Ser. No. 414,226, filed Sept. 2, 1982, now U.S. Pat. No. 4,529,752, and U.S. pat. application Ser. No. 443,545, filed Nov. 22, 1982, now U.S. Pat. No. 4,585,848 all of which are assigned to the same assignee as the present invention and are incorporated herein by reference.

While any of the foregoing compositions can be prepared by merely mixing the various components together, it is often most convenient to prepare these compositions in two separate portions or packages which are combined at the time the compositions are to be converted to the solid, cured, elastic state. In the case of such a two component formulation it is convenient to include in the first package the vinyl-containing polysiloxane, the precious metal catalyst, and some or all of a finely divided filler. The second package contains as its sole essential ingredient the organohydrogenpolysiloxane crosslinking agent, but as a matter of convenience the second package can also contain a portion of the vinyl-containing base polymer and a portion of the finely divided filler.

The finely divided filler typically includes at least some fumed silica or treated fumed silica, both of which are known to contain silanol groups. Furthermore, it is not uncommon to include silanol functional plasticizing agents in silicone compositions, especially condensation curable room temperature vulcanizing silicone compositions.

On occasion the aforesaid curable silicone compositions have exhibited premature curing. Such premature curing has been both dramatic, for example, curing in the doughmixer, and subtle, such as gradual increasing of the viscosity of the composition to a point where processing was precluded. This premature curing was particularly noticeable in the aforesaid second component of two component addition curable compositions. Since the second component generally contains some vinyl-containing polymer it was thought that such premature curing was due to precious metal catalyst contamination.

The present applicants have now discovered that the true cause of premature curing is a Lewis acid catalyzed condensation reaction involving the organohydrogenpolysiloxane and silanol containing components such as the filter and/or plasticizer. The Lewis acid catalyst is believed to be generated in situ, for example, through the reaction of trace amounts of HCl and/or chlorosilanes with a group VIII metal used in a coloring agent of the second component.

SUMMARY OF THE INVENTION

It is an object of the present invention to provide curable silicone compositions which do not exhibit premature curing.

It is another object of the present invention to provide a method to prevent premature curing of curable silicone compositions.

In its broadest aspect there is provided by the present invention an improved method for substantially eliminating premature curing of curable silicone compositions, the improvement comprising admixing with said curable silicone composition an amount of Lewis base effective to substantially neutralize any Lewis acid present therein.

There is also provided an improved curable silicone composition, the improvement comprising an amount of Lewis base effective to substantially neutralize any Lewis acid present therein.

DESCRIPTION OF THE INVENTION

In accordance with the present invention there is provided an improved method for substantially eliminating premature curing of curable silicone compositions, the improvement comprising admixing with said curable silicone composition an amount of Lewis base effective to substantially neutralize any Lewis acid present therein.

In accordance with a second aspect of the present invention there is provided an improved curable silicone composition, the improvement comprising an amount of Lewis base effective to substantially neutralize any Lewis acid present therein.

The problem of premature curing is most common in addition curing silicone compositions, however, it can occur in any curable silicone composition which contains both silicon-bonded hydrogen atoms and silanol groups. By an addition curing silicone composition is meant a composition comprising:
  (a) an olefin-containing polydiorganosiloxane,
  (b) an organohydrogenpolysiloxane crosslinking agent, and
  (c) a precious metal or precious metal containing hydrosilylation catalyst effective to promote crosslinking of said olefin-containing polydiorganosiloxane and said organohydrogenpolysiloxane.

Those skilled in the art will appreciate that the olefin-containing polydiorganosiloxane normally utilizes vinyl radicals as the olefinic groups and that such polymers generally have a viscosity of from about 1000 to 500,000 centipoise at 25° C. In order to avoid an elastomer which is too tightly cured, which adversely affects tensile strength, tear resistance and resilience, it is preferred that substantially all of the vinyl radicals be bonded to the terminal siloxy units of the polymer chain. If it is desired to obtain an elastomer which is solvent resistant, the artisan will appreciate that the presence of perfluoroalkyl-containing siloxy units will impart such property. Preferably, the perfluoroalkyl units will be 3,3,3-trifluoropropyl units and will be present in an amount of from about 5 to 98 mole percent.

The organohydrogenpolysiloxane can be any polysiloxane containing silicon-bonded hydrogen atoms. Those of ordinary skill in the art will appreciate that this includes both resinous polymers and substantially linear polymers. If a solvent resistant fluorosilicone composition is contemplated it is preferable that the organohydrogenpolysiloxane also contain perfluoroalkylsiloxy units.

As the precious metal or precious metal containing hydrosilylation catalyst there can be employed any of those which are well known in the art. Especially preferable are the platinum and rhodium based catalysts which are effective for catalyzing the reaction between silicon-bonded hydrogen atoms and silicon-bonded olefinic groups and which are freely miscible in the silicone polymers. Among the most preferred hydrosilylation catalysts are the platinum hydrocarbon complexes described in U.S. Pat. Nos. 3,159,601 and 3,159,662 to Ashby and the platinum alcoholate catalysts described in U.S. Pat. No. 3,220,970 to Lamoreaux, as well as the platinum containing catalysts of U.S. Pat. No. 3,814,730 to Karstedt and U.S. Pat. No. 3,516,946 to Modic, all of which patents are incorporated herein by reference. Other hydrosilylation catalyst useful in the present invention include those which are silicone soluble complexes of the metals ruthenium, palladium, osmium and iridium. Preferably, the catalyst is present in an amount ranging from 10 to 150 parts per million, as metal.

Such addition curable silicone compositions may include additional components depending upon the particular application contemplated. Among the more commonly utilized additional components are reinforcing fillers such as fumed silica, precipitated silica, treated fumed silica and treated precipitated silica; extending fillers such as calcium carbonate and ground quartz; MQ and MDQ reinforcing resins; and silanol-containing moieties such as plasticizers, mold release agents and process aids. Reinforcing fillers are also within the scope of silanol-contaning moieties as they are known to have silanol groups bonded on the surface of the filler particles.

For convenience, addition curable silicon compositions are usually sold to the end-user in two components or packages. The first package usually includes the olefin-containing polydiorganosiloxane, the hydrosilylation catalyst and some or all of the filler. The second package contains as its sole essential ingredient, the organohydrogenpolysiloxane, but as a matter of convenience the second package usually also contains a portion of the olefin-containing polydiorganosiloxane, the silanol-containing plasticizer or process aid, and some of the filler. In selecting the components for each package it is best not to include both the hydrosilylation catalyst and the organohydrogenpolysiloxane in the same package. Other variations of multi-component packaging will be obvious to those skilled in the art. Particularly useful variations can be derived from Eckberg, U.S. Pat. No. 4,448,815.

When such a two package system is employed, the two packages are merely mixed in suitable fashion at the point of use and the mixture is maintained at the curing temperature until curing has been completed. The details of curing the compositions depend upon the particular application and are well known in the art.

On occasion the second, or organohydrogenpolysiloxane containing, component has exhibited premature curing. Such premature curing has been both dramatic, for example, curing while in the doughmixer, or subtle, for example, gradually increasing in viscosity over a period of time prior to use to the point where it could not be processed. It has now been discovered that such premature curing is caused by Lewis acids catalyzing a condensation reaction between the organohydrogen polysiloxane crosslinking agent and silanol-containing components such as filler, plasticizer or processing aids. It is believed that the Lewis acids are generated in situ by the reaction of trace amounts of HCl and/or chlorosilanes with a group VIII metal such as is used in the coloring agents of the hydride-containing second component.

Having discovered the source or cause of the premature curing, the instant applicants were able to obviate the problem by adding to the composition, more particularly the hydride containing component of said composition, an amount of Lewis base effective to substantially neutralize said Lewis acid. Although it is comtemplated that any Lewis base can be added to the curable silicone composition, it is preferable that the Lewis base be a group 2A or group 2B metal oxide. More preferably, the Lewis base is selected from the group consisting of magnesium oxide, calcium oxide, barium oxide and zinc oxide, and most preferably is selected from the group consisting of magnesium oxide and calcium oxide. Of course, mixtures of any of the foregoing are also within the scope of the present invention and the appended claims.

In the practice of the present invention it has been found that an effective amount of Lewis base generally ranges from about 0.05 to about 3.0 parts by weight based on the total composition or, in the case of a two package system, based on the hydride and silanol containing package. Because the presence of an excessive amount of Lewis base will adversely affect the thermal aging of the cured composition it is preferable to utilize from about 0.15 to about 2.0 parts by weight and, more preferably, from about 0.2 to about 0.5 parts by weight of Lewis base.

The artisan will appreciate that it is important to thoroughly admix the Lewis base with the curable silicone composition in order to avoid isolated pockets of premature curing as a result of areas having a large concentration of Lewis acid.

While the present invention has been described with reference to addition curing silicone compositions, it is to be understood that the present invention contemplates the addition of Lewis base to any curable silicone composition containing both hydride and hydroxyl moieties. Thus, for example, it is within the scope of the present invention to add a Lewis base to the composition described in U.S. Pat. No. 3,888,815, assigned to the same assignee as the present invention, in those cases where the silanol-containing base polymer component also includes a hydride-containing moiety. Of course, the present invention does not apply in those instances where an acid condensation catalyst is intentionally employed.

The method of the present invention comprises admixing with a curable silicone composition containing both hydride and hydroxyl moieties, an amount of Lewis base effective to substantially neutralize any Lewis acid present therein. Of course, when the curable silicone composition is provided the end-user in two packages, the Lewis base is admixed with the package containing the hydride and hydroxyl moieties.

In order to better enable the artisan to practice the present invention, the following examples are provided by way of illustration and not by way of limitation. All parts are by weight unless otherwise noted.

EXAMPLES

Example 1

A composition representative of the second package of a two package addition curable silicone composition was prepared by admixing 100 parts of a vinyl-terminated polydimethyl-3,3,3-trifluoropropylmethylsiloxane copolymer having a viscosity of about 20,000 cps. at 25° C. and about 40 mole percent fluorosiloxy containing units; 16 parts silazane treated fumed silica; 21 parts silazane treated Zeothix 95; 5 parts of 10 micron Minusil ®; 5 parts fluorosilicone fluid having a vinyl terminal unit at one polymer chain end and methyl terminal units at the other polymer chain end; 5 parts of a silanol containing fluorosilicone fluid; 3.4 parts of a color masterbatch containing a group VIII metal; and 1.9 parts organohydrogenpolysiloxane crosslinking agent.

To a portion of the representative second package of a two package system was thoroughly admixed a small amount of $FeCl_3$. To one half of such composition there was also thoroughly admixed approximately an equal amount of magnesium oxide. In a short time the composition containing only $FeCl_3$ began to cure whereas the composition containing both $FeCl_3$ and MgO exhibited no premature curing.

This example illustrates the suitability of Lewis bases to prevent premature curing caused by Lewis acids.

EXAMPLE 2

This example shows that the presence of Lewis bases in preferred amounts does not adversely affect the properties of the cured composition.

A first package of a two package addition curable silicone composition was prepared by excluding from the composition of Example 1 the color masterbatch and the organohydrogenpolysiloxane, and substituting therefor 0.1 part of platinum complex hydrosilylation catalyst and 0.1 part diallylmaleate.

To representative samples of the second package was added 0.25 parts MgO, 2.0 parts MgO, 0.25 parts CaO, and 2.0 parts CaO. The first and second packages were subsequently mixed together in a ratio of 1:1 and cured to provide silicone elastomers having the physical properties set forth in Table 1 to Table 3.

TABLE 1

| Properties: | Standard Formulation | MgO 0.25 parts | MgO 2.0 parts | CaO 0.25 parts | CaO 2.0 parts |
|---|---|---|---|---|---|
| | Post cure 5 min./177° C. and post bake 4 hrs./104° C. | | | | |
| Shore A | 42 | 42 | 43 | 44 | 43 |
| Tensile, psi | 770 | 800 | 810 | 820 | 810 |
| Elongation, % | 510 | 520 | 520 | 550 | 550 |
| Die B Tear, pi | 90 | 90 | 95 | 98 | 98 |
| Bashore | 43 | 42 | 42 | 39 | 39 |
| Specific Gravity | 1.278 | 1.185 | 1.289 | 1.289 | 1.295 |
| Shrinkage, % | 4.1 | 3.8 | 4.1 | 4.1 | 4.1 |
| Compression Set 22 hrs./177° C., % | 26 | 26.2 | 26.8 | 27.4 | 25.6 |

TABLE 2

| | Monsanto Rheometer, 3° Arc, 204° C. | | | | |
|---|---|---|---|---|---|
| | Standard Formulation | MgO 0.25 parts | MgO 2.0 parts | CaO 0.25 parts | CaO 2.0 parts |
| Cure Rate mg/min. | 160 | 170 (180)* | 160 | 180 | 170 |
| State-of-Cure mg | 44 | 43 (43)* | 42.5 | 42 | 43.5 |
| Time to 90% cure, m. | 0.35 | 0.3 (0.3)* | 0.45 | 0.3 | 0.3 |
| Time to opt cure, m. | 0.7 | 0.7 (0.7)* | 1.20 | 0.6 | 0.6 |

*Value measured after standing for 60 days at 25° C.

TABLE 3

| | Resistance to Thermal Aging, Days/204° C. | | | | | |
|---|---|---|---|---|---|---|
| | Std. Formulation | | MgO 0.25 Parts | | MgO 2.0 Parts | |
| Time | Δ Wgt. % | Δ Area % | Δ Wgt. % | Δ Area % | Δ Wgt. % | Δ Area % |
| 11 day | 2.1 | 1.6 | 2.1 | 2.1 | 3.9 | 2.4 |
| 21 day | 3.9 | 3.6 | 4.4 | 3.5 | 8.1 | 5.7 |
| 35 day | 8.1 | 5.1 | 8.9 | 7.1 | 12.4 | 9.1 |
| 43 day | 10.9 | 7.8 | 11.9 | 9.2 | 15.1 | 11.7 |

The foregoing results show that the presence of effective amounts of Lewis bases does not adversely affect the physical properties of the cured composition.

We claim:

1. In a curable silicone composition comprising:
   I. a first package comprising:
      (a) an olefin-containing polydiorganosiloxane, and
      (b) a precious metal or precious metal containing hydrosilation catalyst, and
   II. a second package comprising:
      (c) an organohydrogenpolysiloxane crosslinking agent, the improvement comprising including in said second package from about 0.05 to about 3.0 parts by weight of Lewis base to substantially neutralize any Lewis acid present in said second package which was generated in situ.

2. The composition of claim 1, wherein the second package of said curable silicone composition further comprises a silanol-containing moiety.

3. The composition of claim 2, wherein the silicone composition is a fluorosilicone composition.

4. The composition of claim 1 or 2, wherein the Lewis base is a group 2A or group 2B metal oxide.

5. The composition of claim 4, wherein the Lewis base is selected from the group consisting of magnesium oxide, calcium oxide, barium oxide and zinc oxide.

6. The composition of claim 4, wherein the Lewis base is selected from the group consisting of magnesium oxide and calcium oxide.

7. The composition of claim 1 or 2, wherein the Lewis base is present in an amount of from about 0.15 to about 2.0 parts by weight.

8. The composition of claim 1 or 2, wherein the Lewis base is present in an amount of from about 0.2 to about 0.5 parts by weight.

9. A curable silicone composition, comprising:
(a) a first component comprising:
   (i) an olefin-containing polydiorganosiloxane, and
   (ii) a precious metal or precious metal containing hydrosilylation catalyst; and
(b) a second component comprising:
   (iii) an organohydrogenpolysiloxane corsslinking agent,
   (iv) at least one silanol-containing moiety,
   (v) about 0.05 to about 3.0 parts by weight of Lewis base to substantially neutralize any Lewis acid present in said second component which was generated in situ, and
   (vi) an effective amount of coloring agent.

10. A method for preventing premature curing of curable silicone compositions comprising admixing the contents of:
I. a first package comprising:
   (a) an olefin-containing polydiorganosiloxane, and
   (b) a precious metal or precious metal containing hydrosilylation catalyst, and
II. a second package comprising:
   (c) an organohydrogenpolysiloxane crosslinking agent, and
   (d) from about 0.05 to about 3.0 parts by weight of Lewis base to substantially neutralize any Lewis acid present therein which was generated in situ.

11. The method of claim 10, where the second package of said curable silicone composition further comprises a silanol-containing moiety.

12. The method of claim 11, wherein the silicone composition is a fluorosilicone composition.

13. The method of claim 10 or 11, wherein the Lewis base is a group 2A or group 2B metal oxide.

14. The method of claim 13, wherein the Lewis base is selected from the group consisting of magnesium oxide, calcium oxide, barium oxide and zinc oxide.

15. The method of claim 13, wherein the Lewis base is selected from the group consisting of magnesium oxide and calcium oxide.

16. The method of claim 10 or 11, wherein the Lewis base is present in an amount of from about 0.15 to about 2.0 parts by weight.

17. The method of claim 10 or 11, wherein the Lewis base is present in an amount of from about 0.2 to about 0.5 parts by weight.

18. A method for making one component of a multi component addition curable silicone composition which does not cure prior to mixing with the other components of said curable silicone composition, comprising: mixing:
(a) an organohydrogenpolysiloxane crosslinking agent,
(b) at least one silanol-containing moiety, and
(c) from about 0.05 to about 3.0 parts by weight of Lewis base to substantially neutralize any Lewis acid present in said component which was generated in situ.

* * * * *